United States Patent [19]

Pipa et al.

[11] Patent Number: 4,545,451
[45] Date of Patent: Oct. 8, 1985

[54] TOY VEHICLE WITH AN AUTOMATIC TRANSMISSION

[75] Inventors: William J. Pipa, New Hyde Park, N.Y.; Leslie D. Turbowitz, West Orange, N.J.

[73] Assignee: Azrak-Hamway International, Inc., New York, N.Y.

[21] Appl. No.: 633,700

[22] Filed: Jul. 23, 1984

[51] Int. Cl.⁴ .................. B60K 17/00; F16H 5/52
[52] U.S. Cl. .................. 180/70.1; 74/337; 446/463; 180/233
[58] Field of Search .......... 180/70.1, 233; 74/337; 192/54, 55, 56 R; 446/463

[56] References Cited

U.S. PATENT DOCUMENTS

| 1,398,763 | 11/1921 | Bearens | 74/337 X |
| 1,420,514 | 6/1922 | Bearens | 74/337 X |
| 1,754,307 | 4/1930 | Conboy | 446/433 |
| 1,810,450 | 6/1931 | Von Broembsen | 74/337 |
| 3,377,742 | 4/1968 | Sheldon et al. | 446/446 |
| 3,540,152 | 11/1970 | Beny et al. | 446/433 |

Primary Examiner—Harry Tanner
Attorney, Agent, or Firm—Amster, Rothstein & Engelberg

[57] ABSTRACT

A toy vehicle includes a transmission that automatically shifts from high speed to low speed when a load is placed on the rear wheels, due to rough terrain or otherwise, in either the forward or reverse direction. An alternate embodiment of the invention includes a second clutch mechanism that simultaneously engages and drives a second set of wheels when the transmission shifts from high to low speed.

5 Claims, 8 Drawing Figures

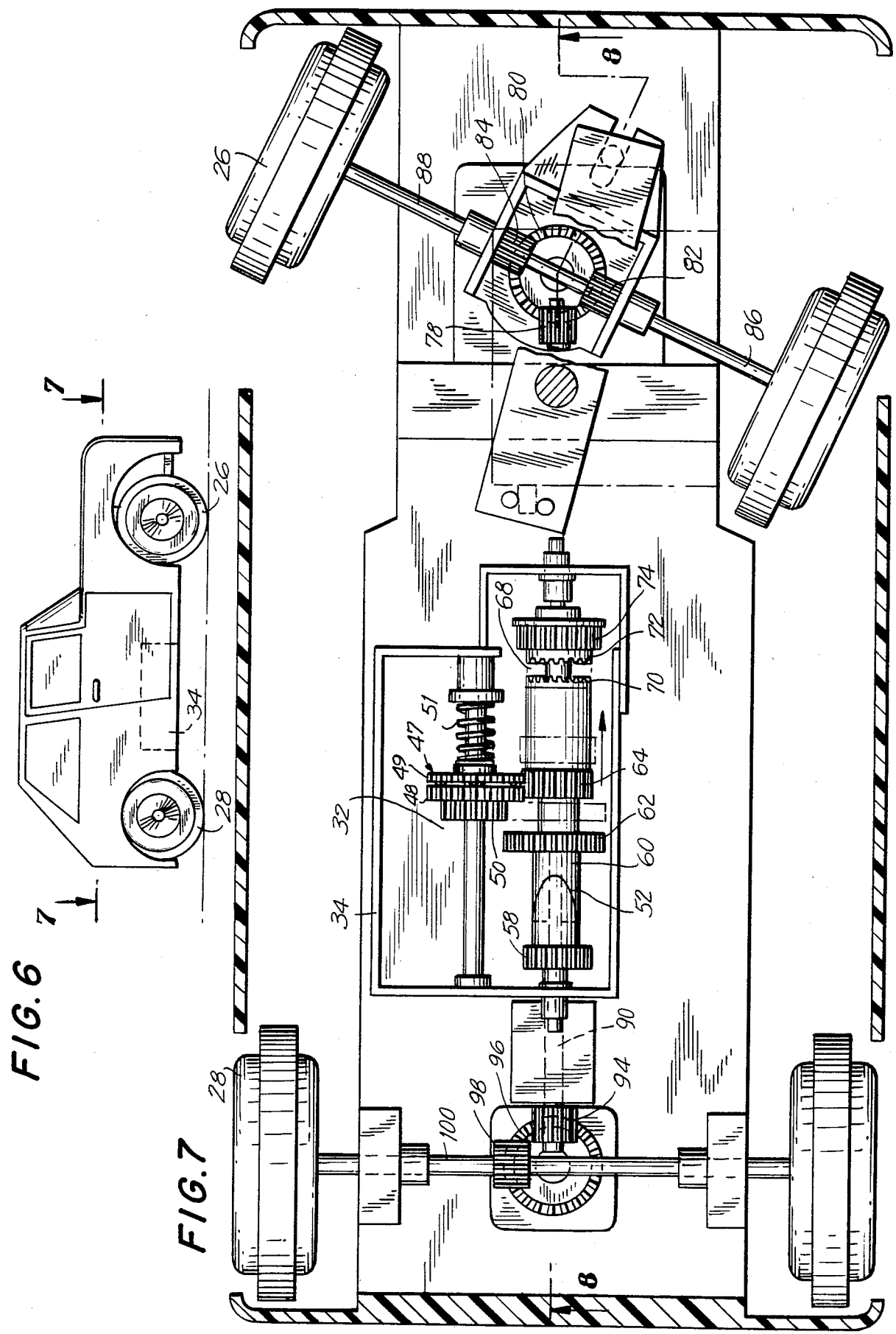

4,545,451

TOY VEHICLE WITH AN AUTOMATIC TRANSMISSION

BACKGROUND OF THE INVENTION

This invention generally relates to a toy vehicle with a transmission that automatically shifts, upon demand, from high to low speed in both the forward and reverse directions while simultaneously shifting from two-wheel to four-wheel drive.

DESCRIPTION OF THE PRIOR ART

Transmissions that automatically shift in the forward direction into higher and lower gears are well-known in the prior art. Examples of such transmissions are disclosed in U.S. Pat. No. 1,810,450, U.S. Pat. No. 3,377,742 and U.S. Pat. No. 3,540,152.

However, with off the road and four-wheel drive vehicles becoming ever popular, there is a great demand to inexpensively reproduce the action of such vehicles in toys for children. To be competitive and successful in the market place, it is imperative that these toys be constructed as simply as possible, yet operate in a true to life manner.

In the prior art, U.S. Pat. No. 3,540,152 discloses a transmission that normally operates in high gear. As the load on the drive wheels is increased, a coupling element is pushed apart, overcoming the force of a biasing spring and shifting the transmission from high speed to low speed. An overriding ratchet type clutch is incorporated into the shifting gears to facilitate shifting and insure that the output gear does not rotate faster than its connected low gear. This ratchet clutch, similarly disclosed in U.S. Pat. No. 1,810,450, allows shifting to occur only in the forward direction.

U.S. Pat. No. 3,377,742, discloses a simple, automatic two-speed transmission where shifting from low to high speed is accomplished by a centrifugal force mechanism at higher speeds. A transmission of this configuration would not allow a toy vehicle to shift from high speed to low speed upon demand, but would always initiate vehicle movement in low speed and only shift to high speed when increased vehicle speed created sufficient centrifugal force to allow the transmission to shift. Transmission shifting would not be related to the toy vehicles requirements, based on the terrain over which it is traveling, but would be dictated solely by the toy's speed.

OBJECTS AND SUMMARY OF THE INVENTION

It is an object of the present invention to overcome these shortfalls in the prior art.

It is a general object of this invention to provide a toy vehicle with an automatic transmission that can shift from high speed to low speed, upon load demand, in both the forward and reverse directions.

It is a specific object of the present invention to provide an automatic transmission for use in a toy vehicle that is inexpensive to produce, functional in both the forward and reverse directions and operational in a manner similar to automobile automatic transmissions, whereby shifting occurs upon demand.

It is a more specific object of this invention to provide an automatic transmission for a toy vehicle where, upon demand in both the forward and reverse directions, the vehicle shifts from high speed to low speed and simultaneously shifts from two-wheel to four-wheel drive.

These and other objects are accomplished in accordance with the present invention where motor means are provided which, through a series of intermediate gears and pinions, powers a first intermediate shaft. A second intermediate shaft, continuously driven by the first intermediate shaft, is equipped with a high speed driving gear and a low speed driving gear. The high speed driving gear is formed of two interlocking pieces so that one piece rotates with the movement of the second intermediate shaft and the second piece is free to rotate about the second intermediate shaft. Spring means biases the two pieces together yet allows the second piece to disengage from the first to facilitate smooth shifting in both the forward and reverse directions and insure that continuous power is applied to the wheels during shifting. A clutch shaft assembly is provided which comprises a shaft and a clutch means where a first side of the clutch means is directly geared to one set of drive wheels and a second side of the clutch means is drivingly engaged with the second intermediate shaft through either a low speed driven gear or a high speed driven gear formed with the second side of the clutch means and slidably mounted on the shaft. Spring means biases the second side of the clutch means so that the high speed driving gear on the second intermediate shaft is engaged with the high speed driven gear on second side of the clutch means so that the toy vehicle normally operates in high speed. When the drive wheels experience a load due to a change in the driving terrain or otherwise, a torsional force is exerted on the first side of the clutch means. The clutch means is formed by two inclined interlocking forks with the second side of the clutch means spring biased to engage the first side of the clutch means. When a torsional force greater than the force exerted by the spring means is exerted on the first side of the clutch means, the second side of the clutch means is forced away from the first side, disengaging the high speed driving gear on the second intermediate shaft upon the high speed driven gear formed with the second side of the clutch means and urging the low speed driven gear formed with the second side of the clutch means to engage the low speed driving gear on the second intermediate shaft to drive the toy vehicle in low speed.

In an alternative embodiment of the present invention, a second clutch means is provided which becomes engaged when the transmission is shifted into low speed. A first side of the second clutch means is formed with the second side of the first clutch means. A second side of the second clutch means is directly geared to a second set of wheels. When the toy vehicle automatically shifts from high to low speed, the vehicle simultaneously shifts from two-wheel to four-wheel drive.

These and other objects of the present invention will become more apparent to a worker skilled in the art upon reading the following detailed description taken in conjunction with the accompanying drawings.

BRIEF DESCRIPTION OF THE DRAWINGS

FIG. 6 shows a side view of an alternate embodiment of the present invention with the transmission housing shown in phantom;

FIG. 7 is a cut-away view of the top of the vehicle shown in FIG. 6, showing the inventive transmission in an alternate embodiment where it is connected to the front wheels, as well as the rear wheels for automatic shifting into four-wheel drive when the toy vehicle automatically shifts into low gear;

Referring to FIGS. 1, 2 and 3, toy vehicle 20 includes a body 22, which can be molded into any style of vehicle and a chassis 24 which has two sets of rotatably mounted wheels, 26 and 28. Toy vehicle 20 is powered by a battery operated motor 30 which generally propels toy vehicle 20 in either a high speed mode or a low speed mode through a unique transmission 32. Transmission 32, housed in transmission housing 34, includes: pinion 35 mounted on motor 30; intermediate gear 36 formed with pinion 38; first intermediate shaft 40 supporting gear 42 and drive gear 44; second intermediate shaft 46 which supports high speed driving gear 47 constructed in two pieces 48, 49 and coaxially mounted with low speed driving gear 50; spring 51 which biases gear 49 towards gear 48; and clutch shaft assembly 52. The clutch shaft assembly 52 includes shaft 54, first clutch member 56, which is formed with drive gear 58 connected to rear wheels 28 through final drive gear 59, and second clutch member 60 biased towards first clutch member 56 by spring means 61 and formed with low speed driven gear 62 and high speed driven gear 64.

Referring now to FIGS. 7-8, in a alternate embodiment of toy vehicle 20, which functions to automatically shift toy vehicle 20 into four-wheel drive from two-wheel drive when it automatically shifts to low speed, a second clutch means 68 is provided so that a first clutch member 70 of second clutch means 68 is engaged with the second clutch member 60 of first clutch means 52. The second clutch member 72 of second clutch means 68 is formed with front drive gear 74 which is engaged with front drive shaft 76 through drive shaft gear 77. Drive shaft 76 is connected to front wheels 26 through pinion 78, crown gear 80 and pinions 82, 84 connected to axles 86, second clutch member 60 of first clutch means 52. The second clutch member 72 of second clutch means 68 is formed with front drive gear 74 which is engaged with front drive shaft 76 through drive shaft gear 77. Drive shaft 76 is connected to front wheels 26 through pinion 78, crown gear 80 and pinions 82, 84 connected to axles 86, 88 respectively. Rear wheels 28, in the alternative embodiment are connected to transmission 32 through rear drive shaft 90 which is powered by first clutch member 56 of first clutch means 52 through gear 92. Pinion 94 mounted on the other end of drive shaft 90 drives crown gear 96 which in turn drives final drive gear 98 mounted on rear drive shaft 100 upon which rear wheels 28 are mounted.

Referring now to FIGS. 2, 3 and 5, when motor 30 is activated, pinion 35 is rotated, thereby causing rotation of intermediate gear 36 and pinion 38, driving first intermediate shaft 40 through gear 42. Gear 44, driven by first intermediate shaft 40, drives high speed driving gear 47 and second intermediate shaft 46. High speed driving gear 47 in turn drives high speed driven gear 64 which in turn drives coaxially mounted gear 58 which is engaged with final drive gear 59 to drive rear wheels 28. When rear wheels 28 are put under a load, such as when toy vehicle 20 operates either uphill or over adverse terrain, a tortional force is exerted on first clutch member 56 through final drive gear 59 and gear 58. When this tortional force is greated than the force exerted by spring means 61 or second clutch member 60, second clutch member 60 is forced away from first clutch member 56, as shown in FIG. 5. When this occurs, high speed driven gear 64 disengages from high speed driving gear 47 and low speed driven gear 62 engages low speed driving gear 50 which is mounted on second intermediate shaft 46. When the tortional force exerted on first clutch member 56 decreases to a force less than that exerted by spring means 61, second clutch member 60 is once again urged into engagement with first clutch member 56. When this happens, low speed driven gear 62 formed with second clutch member 60 disengages from low speed driving gear 50. High speed driven gear 88 respectively. Rear wheels 28, in the alternative embodiment are connected to transmission 32 through rear drive shaft 90 which is powered by first clutch member 56 of first clutch means 52 through gear 92. Pinion 94 mounted on the other end of drive shaft 90 drives crown gear 96 which in turn drives final drive gear 98 mounted on rear drive shaft 100 upon which rear wheels 28 are mounted.

Referring now to FIGS. 2, 3 and 5, when motor 30 is activated, pinion 35 is rotated, thereby causing rotation of intermediate gear 36 and pinion 38, driving first intermediate shaft 40 through gear 42. Gear 44, driven by first intermediate shaft 40, drives high speed driving gear 47 and second intermediate shaft 46. High speed driving gear 47 in turn drives high speed driven gear 64 which in turn drives coaxially mounted gear 58 which is engaged with final drive gear 59 to drive rear wheels 28. When rear wheels 28 are put under a load, such as when toy vehicle 20 operates either uphill or over adverse terrain, a tortional force is exerted on first clutch member 56 through final drive gear 59 and gear 58. When this tortional force is greater than the force exerted by spring means 61 or second clutch member 60, second clutch member 60 is forced away from first clutch member 56, as shown in FIG. 5. When this occurs, high speed driven gear 64 disengages from high speed driving gear 47 and low speed driven gear 62 engages low speed driving gear 50 which is mounted on second intermediate shaft 46. When the tortional force exerted on first clutch member 56 decreases to a force less than that exerted by spring means 61, second clutch member 60 is once again urged into engagement with first clutch member 56. When this happens, low speed driven gear 62 formed with second clutch member 60 disengages from low speed driving gear 50. High speed driven gear 64 once again engages high speed driving gear 47 mounted on second intermediate shaft 46. High speed driving gear 47 is formed out of 2 gears, a first gear 48 is fixed on second intermediate shaft 46 while a second gear 49 is coaxially mounted with gear 48 but free to rotate about second intermediate shaft 46. Gear 49 is formed with protrusions 49a on the side of gear 49 facing gear 48. Gear 48 is formed with cavities 48a (shown in phantom in FIG. 5) on the side of gear 48 facing gear 49. Protrusions 49a are positioned so that they can align with cavities 48a so that gear 48 can be directly adjacent to gear 49, as shown in FIG. 5. If protrusions 49a are not aligned with cavities 48a, gear 49 is spaced the distance of protrusion 49a away from gear 48. The configuration of gears 48 and 49 eliminates the need for a ratchet mechanism between low speed driven gear 62 and high speed driven gear 64 and allows shifting from high speed to low speed to occur in both the forward and reverse directions. When shifting is occurring from high to low speed, as shown in FIG. 3, gear 49 is carried away from gear 48. This allows power to be continually applied to wheels 28, yet allows low speed driven gear 62 to engage low speed driving gear 50. At the point where low speed driven gear 62 initially engages low speed driving gear 50, gear 49 is positioned so that it can rotate independently from gear 48 allowing slippage to occur between gears 48 and 49, a condition necessitated by second clutch member 60 now being driven at a slower rate. The interaction of gears 48 and 49 work in a similar manner only in reverse sequence when toy vehicle 20 shifts from low speed to high speed.

Referring now to FIGS. 7–8, in an alternate embodiment of toy vehicle 20, second clutch means 68 is provided so that when toy vehicle 20 automatically shifts from high speed to low speed, it also automatically shifts from two-wheel drive to four-wheel drive. This is accomplished by connecting one side 70 of second clutch means 68 to second clutch member 60 of first clutch means 52. The second side 72 of second clutch means 68 is formed with gear 74 which is engaged with gear 75 mounted on front drive shaft 76, which in turn drives front wheels 26 through pinion 78 and crown gear 80 as show in FIG. 7. Crown gear 80 independently drives front wheels 26 through pinions 82 and 84 mounted on the ends of axles 86, 88, respectively, while allowing front wheels 26 to be pivoted about an axis to steer toy vehicle 20. In the alternative embodiment shown in FIGS. 6–10, rear wheels 28 are not directly geared to drive gear 58 formed with first clutch member 56 but are connected to drive gear 58 through rear drive shaft 90 which is engaged with drive gear 58 through drive shaft gear 92. The other end of rear drive shaft 90 is formed with pinion 94 which drives rear wheels 28 through crown gear 96 and final drive gear 98 mounted on rear drive shaft 100.

Figure 1:
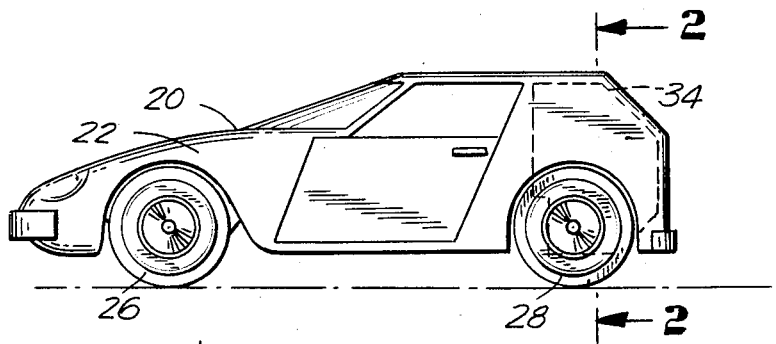
FIG. 1 shows a side view of the toy vehicle with the transmission housing shown in phantom.
Figure 2:
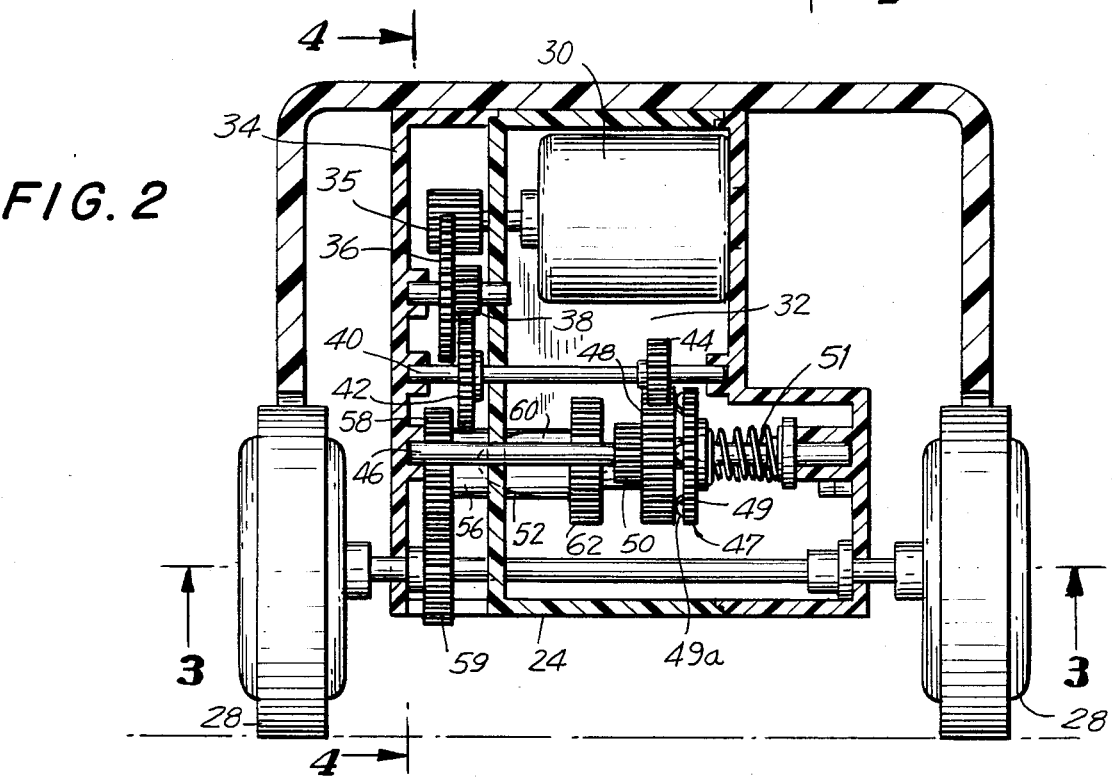
FIG. 2 is a view taken along the line 2—2 of FIG. 1 showing a rear view of the transmission assembly.
Figure 3:
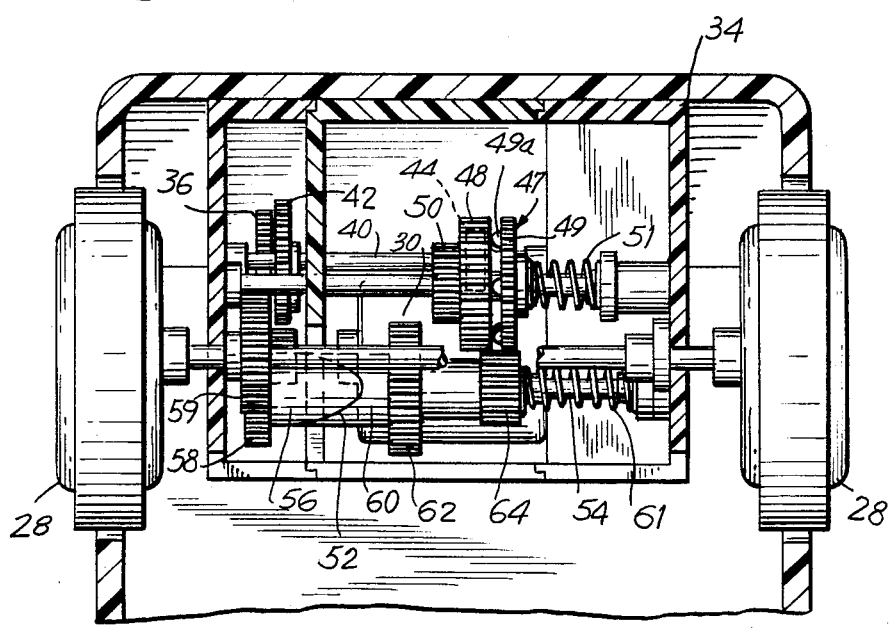
FIG. 3 is a view taken along the line 3—3 of FIG. 2 showing a bottom view of the transmission assembly with the transmission operating in high speed.
Figure 4:
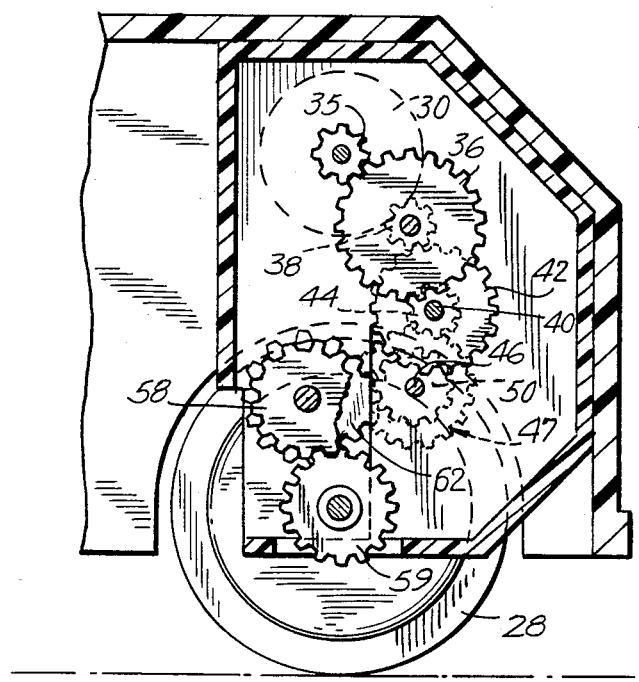
FIG. 4 is a view taken along the line 4—4 in FIG. 2 showing the side of the transmission assembly with the motor shown in phantom.
Figure 5:
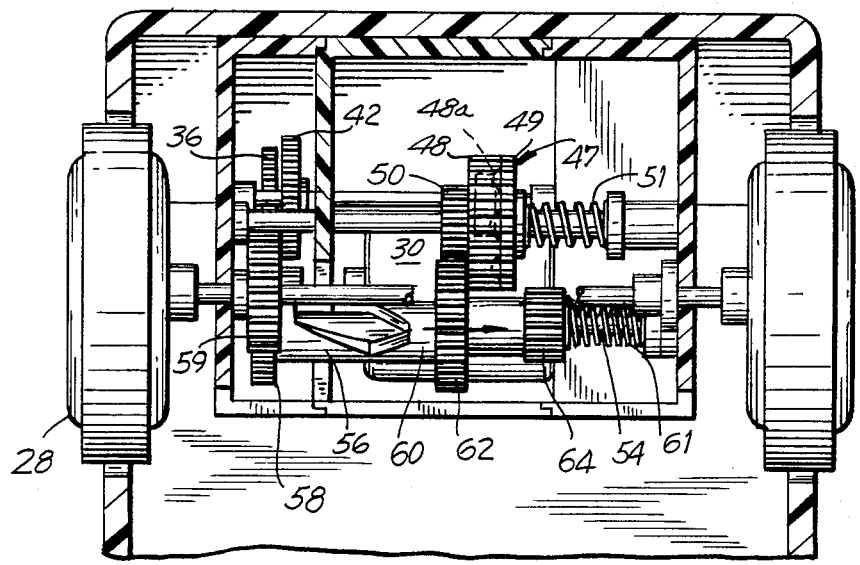
FIG. 5 is a view similar to FIG. 3, taken along the line 3—3 of FIG. 2 showing a bottom view of the transmission assembly with the transmission operating in low speed.
Figure 8:
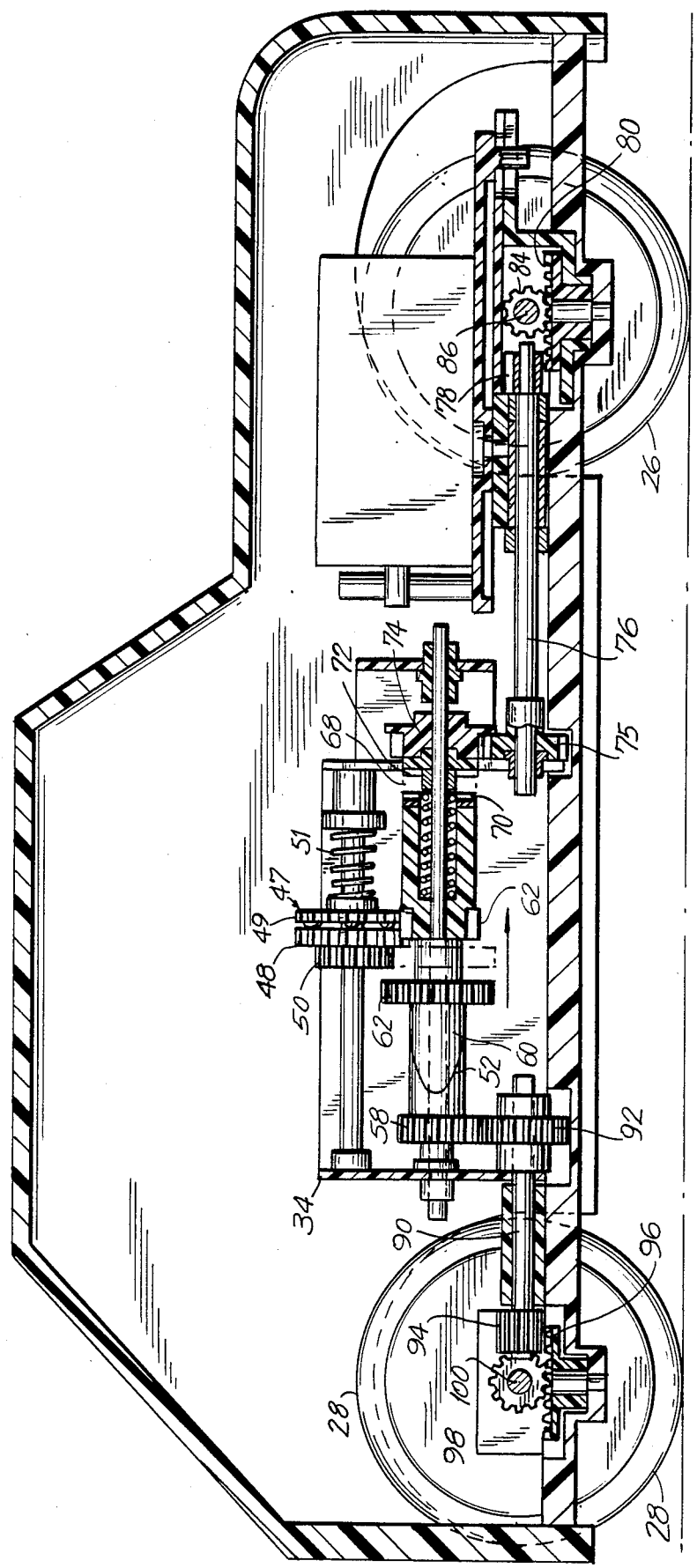
FIG. 8 is a side sectional view taken along the line 8—8 in FIG. 7 showing the inventive transmission connected to both the front and rear wheels in the high speed, two-wheel drive position.

While what has been described is the presently preferred embodiment of the invention, it will be apparent to those skilled in the art that modifications and changes can be made to the invention while keeping within the spirit and scope thereof which is set forth in the appended claims.

I claim:

1. A toy vehicle with an automatic transmission comprising a chassis, four wheels rotatably mounted to said chassis, motor means mounted to said chassis, transmission means drivingly engaged with said motor means and activation means electrically engaged with said motor means, said transmission means comprising gear means operatively engaged with said motor means, an intermediate shaft drivingly engaged with said gear means comprising a shaft, a low speed driving gear and a high speed driving gear mounted on said shaft, said high speed driving gear including a first parallel gear fixed to said shaft, coaxially mounted with said low speed driving gear and formed with cavities in one side, a second parallel gear identical in diameter to said first parallel gear, rotatably mounted on said shaft and formed with protrusions on the side of said second parallel gear facing the cavities of said first parallel gear such that the protrusions of said second parallel gear align with the cavities in said first parallel gear, and first spring means biasing said second parallel gear toward said first parallel gear, and clutch shaft means including a rotatably mounted clutch shaft, a first clutch member operatively engaged with a least one of said wheels, a second clutch member shiftably mounted on said clutch shaft and formed with a low speed driven gear and a high speed driven gear and second spring means adapted to bias said second clutch member into engagement with said first clutch member so that said high speed driving gear is operatively engaged with said high speed driven gear to drive said vehicle at high speed with the movement of said toy vehicle is along flat terrain, said second clutch member adapted to axially shift along said clutch shaft in both the forward and reverse directions when a tortional force is exerted on said first clutch member resulting from the operation of said toy vehicle on adverse terrain causing said high speed driven gear to disengage from said gear means and causing said low speed driven gear to engage said low speed driving gear to drive said toy vehicle at low speed, said first and second parallel gears of said high speed driving gear adapted to allow said high speed driven gear to disengage from said high speed driving gear while said low speed driven gear is simultaneously engaging said low speed driving gear.

2. A toy vehicle with an automatic transmission comprising a chassis, four wheels rotatably mounted to said chassis, motor means mounted to said chassis, transmission means drivingly connected to said motor means and engaged with at least one of said wheels and activation means operatively connected to said motor means, said transmission means comprising a first intermediate shaft drivingly engaged with said motor means, a second intermediate shaft drivingly engaged with said first intermediate shaft and formed with a low speed driving gear and a high speed driving gear, said high speed driving gear comprising a first parallel gear secured on said second intermediate shaft and formed with protrusions on one side of said first parallel gear, a second parallel gear of identical diameter to said first parallel gear, rotatably mounted on said second intermediate shaft and formed with cavities on the side of said second parallel gear facing said protrusions of said first parallel gear so that said protrusions are aligned with said cavities, and first spring means biasing said first parallel gear towards said second parallel gear, and clutch shaft means comprising a rotatably mounted clutch shaft, a first clutch member mounted on said clutch shaft and formed with a final drive gear which is continuously engaged with at least one of said wheels, a second clutch member axially shiftable on said clutch shaft and formed with a low speed driven gear and a high speed driven gear, and second spring means adapted to bias said second clutch member into engagement with said first clutch member so that said high speed driven gear on said second clutch member is drivingly engaged with said high speed driving gear on said second intermediate shaft to drive said toy vehicle at high speed when the movement of said toy vehicle is not impeded, said first clutch member adapted to axially shift said second clutch member away from said first clutch member along the axis of said clutch shaft when the forward and reverse movement of said vehicle is impeded causing a torsional force to be exerted on said first clutch member overcoming the biasing force of said spring means and allowing said low speed driven gear on said second clutch member to engage said low speed driving gear on said second intermediate shaft to drive said toy vehicle at low speed, said first and second parallel gears of said high speed driving gear adapted to allow said high speed driven gear to disengage from said high speed driving gear while said low speed driven gear is simultaneously engaging said low speed driving gear.

3. A toy vehicle with an automatic transmission as claimed in claim 2 whereby a second clutch means is provided to simultaneously engage at least one other of said drive wheels when said transmission automatically shifts into the low gear drive position.

4. A toy vehicle with an automatic transmission as claimed in claim 3 wherein said second clutch means comprises a first clutch member functionally engaged with said second clutch member of said first clutch means, and a second clutch member operatively connected to said at least one other drive wheel, whereby said first clutch member of said second clutch means engages said second clutch member of said second clutch means when said low speed driven gear engages said low speed driving gear.

5. An automatic transmission for driving toy vehicles comprising a housing, a first intermediate shaft rotatably mounted to said housing, a second intermediate shaft drivingly engaged with said first intermediate shaft and formed with a low speed driving gear and a high speed driving gear, said high speed driving gear comprising a first parallel gear secured on said second intermediate shaft and formed with protrusions on one side of said first parallel gear, a second parallel gear of identical diameter to said first parallel gear, rotatably mounted on said second intermediate shaft and formed with cavities on the side of said second parallel gear facing said protrusions of said first parallel gear so that said protrusions are aligned with said cavities, and first spring means biasing said first parallel gear towards said second parallel gear, and clutch shaft means comprising a rotatably mounted clutch shaft, a first clutch member mounted on said clutch shaft and formed with a final drive gear, a second clutch member axially shiftable on said clutch shaft and formed with a low speed driven gear and a high speed driven gear, and second spring means adapted to bias said second clutch member into engagement with said first clutch member so that said high speed driven gear on said second clutch member is drivingly engaged with said high speed driving gear on said second intermediate shaft to drive said final drive gear at high speed when there is no load on said final drive gear, said first clutch member adapted to axially shift said second clutch member away from said first clutch member along the axis of said clutch shaft when a load is created on said final drive gear causing a torsional force to be exerted on said first clutch member overcoming the biasing force of said spring means and allowing said low speed driven gear on said second clutch member to engage said low speed driving gear on said second intermediate shaft to drive said final drive gear at low speed, said first and second parallel gears of said high speed driving gear adapted to allow said high speed driven gear to disengage from said high speed driving gear while said low speed driven gear is simultaneously engaging said low speed driving gear.

* * * * *